(12) United States Patent
Lee et al.

(10) Patent No.: US 11,822,753 B2
(45) Date of Patent: Nov. 21, 2023

(54) TOUCH SENSOR AND TOUCH SENSING METHOD

(71) Applicant: Samsung Electronics Co., Ltd., Suwon-si (KR)

(72) Inventors: Jinchul Lee, Seoul (KR); Yoonkyung Choi, Seongnam-si (KR); Bumsoo Kim, Hwaseong-si (KR); Sanho Byun, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/306,317

(22) Filed: May 3, 2021

(65) Prior Publication Data
US 2022/0043537 A1   Feb. 10, 2022

(30) Foreign Application Priority Data

Aug. 6, 2020   (KR) .......................... 10-2020-0098814

(51) Int. Cl.
*G06F 3/044*     (2006.01)
*G06F 3/041*     (2006.01)

(52) U.S. Cl.
CPC .......... *G06F 3/0446* (2019.05); *G06F 3/0412* (2013.01)

(58) Field of Classification Search
CPC ............................ G06F 3/0412; G06F 3/0446
See application file for complete search history.

(56) References Cited

U.S. PATENT DOCUMENTS

| | | |
|---|---|---|
| 8,988,385 B2 | 3/2015 | Seo et al. |
| 9,182,870 B2 | 11/2015 | Satou et al. |
| 9,195,353 B2 | 11/2015 | Byun et al. |
| 9,619,073 B2 | 4/2017 | Shin et al. |
| 9,927,928 B2 | 3/2018 | Kim |
| 2014/0375591 A1 | 12/2014 | Chang et al. |
| 2015/0062080 A1 | 3/2015 | Kang |
| 2016/0070387 A1* | 3/2016 | Park .................... G06F 3/04166 345/174 |
| 2018/0267670 A1* | 9/2018 | Imanilov ............. G06F 3/04166 |
| 2020/0150795 A1 | 5/2020 | Park et al. |

* cited by examiner

*Primary Examiner* — Robin J Mishler
(74) *Attorney, Agent, or Firm* — HARNESS, DICKEY & PIERCE, P.L.C.

(57) ABSTRACT

A touch sensor of multi-driving scheme includes a touch panel including input lines and output lines, the touch panel causes a change in mutual capacitance in response to touch. Processing circuitry generates transmission signals to the input lines as a result of an encoding operation on a first matrix having an inverse matrix, each of the transmission signals has a first polarity or a second polarity opposite in phase to the first polarity; outputs the transmission signals in an unbalanced period when the sum of phases of the transmission signals is greater than 0; receives receiving signals through the output lines; and decodes the receiving signals based on the first matrix, the receiving signals generated by the change in the mutual capacitance in response to the touch.

15 Claims, 15 Drawing Sheets

FIG. 7

$$\begin{bmatrix} y_1 \\ y_2 \\ y_3 \\ y_4 \end{bmatrix} \propto \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} C_{m1} \\ C_{m2} \\ C_{m3} \\ C_{m4} \end{bmatrix} = H_4 \cdot \begin{bmatrix} C_{m1} \\ C_{m2} \\ C_{m3} \\ C_{m4} \end{bmatrix}$$

$$\rightarrow \begin{bmatrix} C_{m1} \\ C_{m2} \\ C_{m3} \\ C_{m4} \end{bmatrix} \propto H_4^{-1} \cdot \begin{bmatrix} y_1 \\ y_2 \\ y_3 \\ y_4 \end{bmatrix}$$

$$\begin{bmatrix} y_5 \\ y_6 \\ y_7 \end{bmatrix} \propto \begin{bmatrix} 1 & -1 & 1 & -1 \\ 1 & 1 & -1 & -1 \\ 1 & -1 & -1 & 1 \end{bmatrix} \begin{bmatrix} C_{m4} \\ C_{m5} \\ C_{m6} \\ C_{m7} \end{bmatrix} = C_{m4} \cdot \begin{bmatrix} 1 \\ 1 \\ 1 \end{bmatrix} + \begin{bmatrix} -1 & 1 & -1 \\ 1 & -1 & -1 \\ -1 & -1 & 1 \end{bmatrix} \begin{bmatrix} C_{m5} \\ C_{m6} \\ C_{m7} \end{bmatrix}$$

$$\rightarrow \begin{bmatrix} C_{m5} \\ C_{m6} \\ C_{m7} \end{bmatrix} \propto \begin{bmatrix} -0.5 & 0 & -0.5 \\ 0 & -0.5 & -0.5 \\ -0.5 & -0.5 & 0 \end{bmatrix} \cdot \begin{bmatrix} y_5 - C_{m4} \\ y_6 - C_{m4} \\ y_7 - C_{m4} \end{bmatrix}$$

FIG. 9

$$[y_1] \propto [C_{m1}]$$

$$\begin{bmatrix} y_2 \\ y_3 \\ y_4 \end{bmatrix} \propto \begin{bmatrix} 1 & -1 & 1 & -1 \\ 1 & 1 & -1 & -1 \\ 1 & -1 & -1 & 1 \end{bmatrix} \begin{bmatrix} C_{m1} \\ C_{m2} \\ C_{m3} \\ C_{m4} \end{bmatrix} = C_{m1} \cdot \begin{bmatrix} 1 \\ 1 \\ 1 \end{bmatrix} + \begin{bmatrix} -1 & 1 & -1 \\ 1 & -1 & -1 \\ -1 & -1 & 1 \end{bmatrix} \begin{bmatrix} C_{m2} \\ C_{m3} \\ C_{m4} \end{bmatrix}$$

$$\rightarrow \begin{bmatrix} C_{m2} \\ C_{m3} \\ C_{m4} \end{bmatrix} \propto \begin{bmatrix} -0.5 & 0 & -0.5 \\ 0 & -0.5 & -0.5 \\ -0.5 & -0.5 & 0 \end{bmatrix} \cdot \begin{bmatrix} y_2 - C_{m1} \\ y_3 - C_{m1} \\ y_4 - C_{m1} \end{bmatrix}$$

$$\begin{bmatrix} y_5 \\ y_6 \\ y_7 \end{bmatrix} \propto \begin{bmatrix} 1 & -1 & 1 & -1 \\ 1 & 1 & -1 & -1 \\ 1 & -1 & -1 & 1 \end{bmatrix} \begin{bmatrix} C_{m1} \\ C_{m5} \\ C_{m6} \\ C_{m7} \end{bmatrix} = C_{m1} \cdot \begin{bmatrix} 1 \\ 1 \\ 1 \end{bmatrix} + \begin{bmatrix} -1 & 1 & -1 \\ 1 & -1 & -1 \\ -1 & -1 & 1 \end{bmatrix} \begin{bmatrix} C_{m5} \\ C_{m6} \\ C_{m7} \end{bmatrix}$$

$$\rightarrow \begin{bmatrix} C_{m5} \\ C_{m6} \\ C_{m7} \end{bmatrix} \propto \begin{bmatrix} -0.5 & 0 & -0.5 \\ 0 & -0.5 & -0.5 \\ -0.5 & -0.5 & 0 \end{bmatrix} \cdot \begin{bmatrix} y_5 - C_{m1} \\ y_6 - C_{m1} \\ y_7 - C_{m1} \end{bmatrix}$$

TOUCH SENSOR AND TOUCH SENSING METHOD

CROSS-REFERENCE TO RELATED APPLICATION

This application claims the benefit of Korean Patent Application No. 10-2020-0098814, filed on Aug. 6, 2020, in the Korean Intellectual Property Office, the disclosure of which is incorporated herein in its entirety by reference.

BACKGROUND

The inventive concepts relate to a touch sensor, and more particularly, to a touch sensor including a touch panel and a display panel and a touch sensing method.

Due to the increasing usage of touchable electronic devices including, for example, smartphones, the demand for precise touch sensors has increased. A touch sensor including a touch panel and a display panel may include a sensor electrode configured to measure a change in capacitance.

As panels become large-sized and ultrathin, display interference due to touch driving has increased. A high-voltage transmission driving scheme or a multi-channel driving scheme has been used to improve a reduction in touch sensitivity caused by a display common electrode.

SUMMARY

The inventive concepts provide a touch sensor and a touch sensing method to inhibit display interference and improve touch sensitivity.

According to an aspect of the inventive concepts, there is provided a touch sensor of a multi-driving scheme. The touch sensor includes a touch panel including a plurality of input lines and a plurality of output lines, the touch panel configured to cause a change in mutual capacitance in response to a touch; and processing circuitry configured to generate a plurality of transmission signals to the plurality of input lines as a result of an encoding operation on a first matrix having an inverse matrix, each of the transmission signals having a first polarity or a second polarity, the second polarity including an opposite phase to the first polarity; output the plurality of transmission signals in an unbalanced period when a sum of phases of the plurality of transmission signals is greater than 0; receive a plurality of receiving signals through the plurality of output lines; and decodes the plurality of receiving signals based on the first matrix, the plurality of receiving signals are generated by the change in the mutual capacitance in response to the touch.

According to another aspect of the inventive concepts, there is provided a touch sensing method of a multi-driving scheme. The method includes generating a plurality of transmission signals, each transmission signal having a first polarity or a second polarity, the second polarity including an opposite phase to the first polarity; providing the plurality of transmission signals to a touch panel, the touch panel including input lines and output lines; generating a plurality of receiving signals based on a change in a mutual capacitance caused by a touch between the input lines and the output lines; outputting the plurality of receiving signals in response to at least one of the plurality of transmission signals having the first polarity and at least one of the plurality of transmission signals having the second polarity; and detecting an area in which the touch occurred on the touch by determining the mutual capacitance based on the plurality of receiving signals.

According to another aspect of the inventive concept, there is provided a touch sensor including a touch panel including first to M-th input lines and first to N-th output lines configured to perform a touch sensing operation, wherein M is a natural number greater than or equal to 2, and N is a natural number greater than or equal to 2; and processing circuitry configured to generate first to M-th transmission signals based on a Hadamard matrix; output a plurality of the first to M-th transmission signals corresponding to a first row or a first column of the Hadamard matrix in an unbalanced period; output a remainder of the first to M-th transmission signals n a sensing period of the touch panel; and receive first to N-th receiving signals from the first to N-th output lines to determine touch coordinates.

BRIEF DESCRIPTION OF THE DRAWINGS

Some example embodiments of the inventive concepts will be more clearly understood from the following detailed description taken in conjunction with the accompanying drawings in which:

FIG. 7 depicts numerical expressions representing matrices for decoding a receiving signal RXs by using the method of FIG. 6, according to an example embodiment;

FIG. 9 depicts numerical expressions representing matrices for decoding a receiving signal by using a method of FIG. 8, according to an example embodiment;

DETAILED DESCRIPTION OF THE EMBODIMENTS

Hereinafter, some example embodiments will be described in detail with reference to the accompanying drawings.

Figure 1:
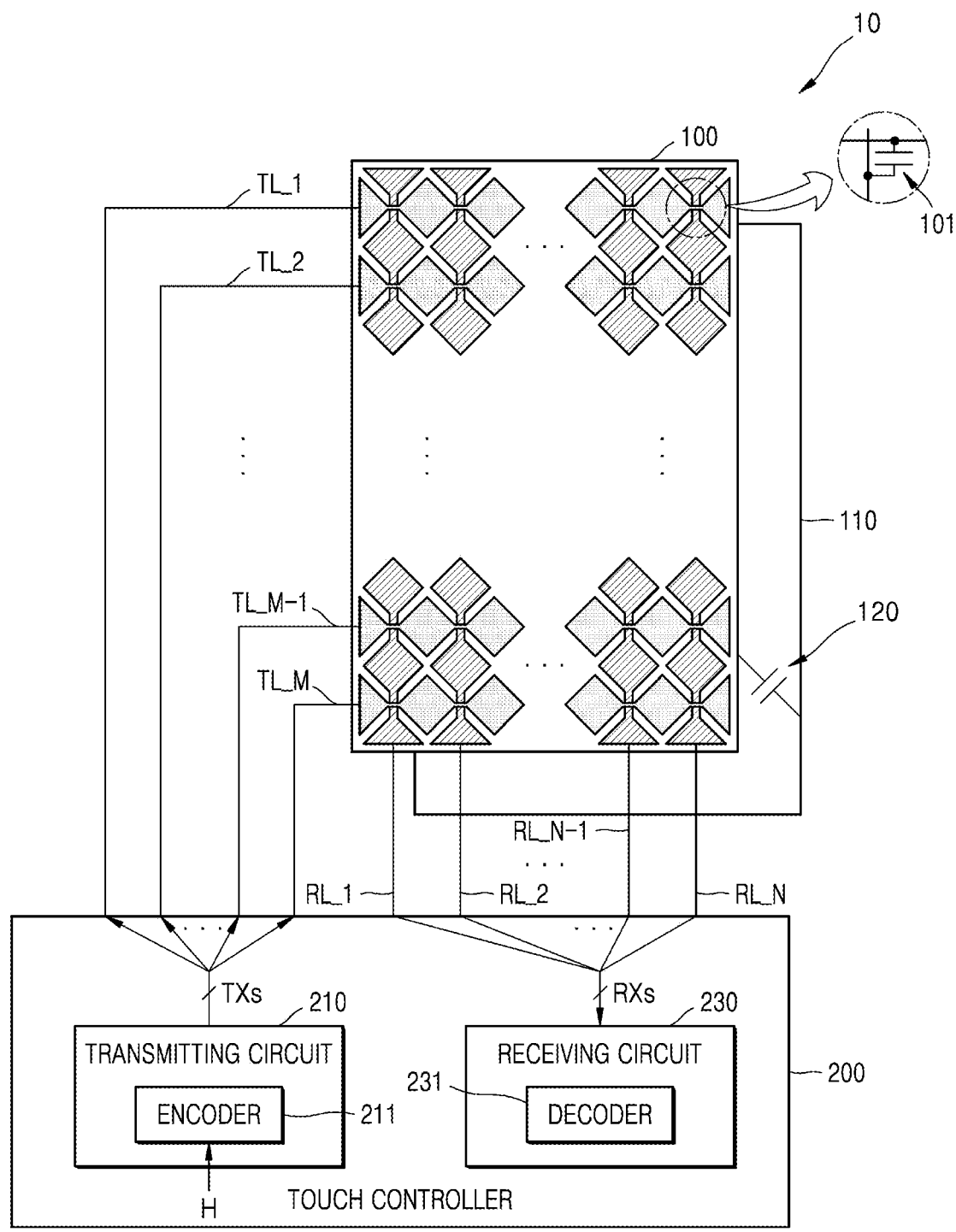
FIG. 1 is a diagram of a touch sensor according to an example embodiment.

FIG. 1 is a diagram of a touch sensor 10 including a touch panel 100 and a touch controller 200, according to an example embodiment.

Referring to FIG. 1, the touch sensor 10 may be included in electronic devices, such portable electronic devices like smartphones, portable phones, tablet personal computers (PCs), laptop computers, and/or audio media players (e.g., MPEG-1 audio layer 3 (MP3) players).

The touch sensor 10 may include a touch panel 100 (e.g., a transparent panel including a touch-sensitive surface) and a touch input unit. The touch sensor 10 may be in front of a display panel 110 of the electronic device. For the example, the touch sensor 10 may be adhered to the front surface of the display panel 110. A touch-sensitive surface of the touch sensor 10 may cover an exposed surface of the display panel 110. The touch sensor 10 may perform an input function that allows a user to manipulate the portable electronic device by simply touching the touch sensor 10 with a conductive object, such as a finger or a stylus pen. A computing system driven by the electronic device may recognize a touch strength and a touch position on the touch panel 100, analyze the touch (e.g., strength, position, and/or duration), perform calculations based on the analysis result, and perform an operation according to, for example, the touch strength and the touch position of the touch.

The touch sensor 10 may include the touch panel 100, the display panel 110, and a touch controller 200. The touch controller 200 may include a transmitting circuit TX (and/or 210) and a receiving circuit RX (and/or 230).

A plurality of sensor electrodes may be arranged in a matrix (e.g., including rows and columns) in the touch panel 100. The plurality of sensor electrodes may be arranged in diamond patterns. The sensor electrodes in each row may be respectively connected to a plurality of input lines TL_1 to TL_M (wherein M is a natural number greater than or equal to 2), and the sensor electrodes in each column may be respectively connected to a plurality of output lines RL_1 to RL_N (wherein N is a natural number greater than or equal to 2). The touch panel 100 may receive transmission signals TXs through the plurality of input lines TL_1 to TL_M from the touch controller 200 and provide receiving signals RXs through the plurality of output lines RL_1 to RL_N to the touch controller 200. The receiving signals RXs may include results obtained by sensing a user's touches. According to an example embodiment, pulse signals may be applied as the transmission signals RXs, and current may be output as the receiving signals RXs.

According to an example embodiment, the sensor electrodes in each row (which are connected to the plurality of input lines TL_1 to TL_M), and the sensor electrodes in each column (which are connected to the plurality of output lines RL_1 to RL_N) are illustrated as being on the same panel (e.g., the touch panel 100), however the inventive concepts are not limited thereto. For example, the sensor electrodes in each row may be at a different layer from the sensor electrodes in each column. For example, the sensor electrodes in each row may be at a first layer, while sensor electrodes in each column may be at a second layer, and thus, errors may be prevented and/or reduced during contact with the touch panel 100. Therefore, although, for brevity, it is illustrated that the sensor electrodes in each row are at the same layer as the sensor electrodes in each column, the inventive concepts are not limited thereto.

A mutual capacitance node may be formed at each of crossing points formed between the sensor electrodes in each row, which receive the transmission signals TXs, and the sensor electrodes in each column, which output the receiving signal RXs. The mutual capacitance node may be modeled by a mutual capacitor 101. For example, the mutual capacitor 101 may be interpreted as being arranged between each row and each column of the sensor electrodes of the touch panel 100.

In an example embodiment, when the conductive object, such as the finger or the stylus, touches the sensor electrode, a mutual capacitance may change at the mutual capacitance node. A change in the mutual capacitance of the mutual capacitance node may be interpreted as a change in capacitance of the mutual capacitor 101. For example, when the touch panel 100 is touched by the conductive object, current may flow from a touched portion through the conductive object to a ground, and an electrical variation caused by the flow of current may lead to a change in a mutual capacitance. The touch sensor 10 may extract touch coordinates using a series of processes according to the change in the mutual capacitance. A touch sensing scheme using mutual capacitive sensing may be referred to as a capacitive sensing scheme.

A scheme in which a touch of the conductive object on the touch panel 100 is sensed by supplying current from the transmitting circuit 210 to one line may be referred to as a single driving scheme. A scheme in which a touch of the conductive object on the touch panel 100 is sensed by supplying current to a plurality of lines may be referred to as a multi-driving scheme. Although FIG. 1 illustrates a case in which a plurality of lines (e.g., the plurality of input lines TL_1 to TL_M and the plurality of output lines RL_1 to RL_N) are connected to the touch panel 100, the inventive concepts are not limited to the multi-driving scheme, and the single driving scheme and/or a combination of the single driving scheme and the multi-driving scheme may be used.

In an example embodiment, the display panel 110 may include at least one gate line, at least one source line, and at least one drain line. A transistor (not illustrated) mounted on the display panel 110 may operate through the gate line, the source line, and the drain line. A drain voltage (e.g., ELVDD) may be supplied through the drain line.

A parasitic capacitance may be formed between the sensor electrode included in the touch panel 100 and a display common electrode included in the display panel 110. The parasitic capacitance may be modeled by a parasitic capacitor 120. Because an electric field effect also occurs in other sensor electrodes near a touched area during a touch operation due to a source voltage ELVSS applied to the touch panel 100, noise may occur. The noise may be referred to as ELVSS noise. As the parasitic capacitance increases, display noise, such as the ELVSS noise, may increase, thus reducing touch sensitivity. Accordingly, a method of removing the display noise may be required.

A high-voltage driving scheme may be used to remove the display noise. However, when a high voltage is applied to drive the touch panel 100, pulse noise, such as voltage glitch, may be produced. Because a source driver supplies an analog voltage to a storage capacitor during a display operation and a sampling hold (S-H) process is also an analog voltage application operation, the pulse noise may cause flicker to a display.

The transmitting circuit 210 may respectively provide the transmission signals TXs to the plurality of input lines TL_1 to TL_M wired in the touch panel 100. The transmitting circuit 210 may include an encoder 211.

The encoder 211 may encode signals (e.g., transmission voltages) and generate the transmission signals TXs. In an example embodiment, the encoder 211 may encode the signals based on a matrix H. Further, because the matrix H used for the encoding process needs to be restored through a decoding process, the presence of an inverse matrix may be required.

In an example embodiment, when the multi-driving scheme is used for the touch sensor 10, the transmission signals TXs provided by the transmitting circuit 210 may be generated based on a Hadamard matrix. The Hadamard matrix will be described in further detail with reference to FIG. 2.

The receiving circuit 230 may receive the receiving signals RXs through the plurality of output lines RL_1 to RL_N. The receiving circuit 230 may include a decoder 231.

In an example embodiment, the decoder 231 may decode the receiving signals RXs based on an inverse matrix of the matrix H and extract mutual capacitances based on the decoding results. The touch controller 200 may calculate a touch position or touch sensitivity of the conductive object on the touch panel 100 based on variations in a plurality of mutual capacitances. For example, the touch controller 200 may include and/or be connected to control logic (not illustrated or refer to 500 in FIG. 18) configured to calculate the mutual capacitance Cm based on the receiving signal RXs and thereby determine a touched area on the touch panel 100

The touch controller 200 and/or the components therein (e.g., the control logic, the transmitting circuit 210, the receiving circuit 230, the encoder 211, and/or the decoder 231) may include and/or be included in processing circuitry such as hardware including logic circuits; a hardware/software combination such as a processor executing software; or a combination thereof. For example, the software may be a machine code, firmware, an embedded code, and application software. For example, the hardware may include an electrical circuit, an electronic circuit, a processor, a computer, an integrated circuit, integrated circuit cores, a microelectromechanical system (MEMS), a passive element, and/or a combination thereof.

Figure 2:
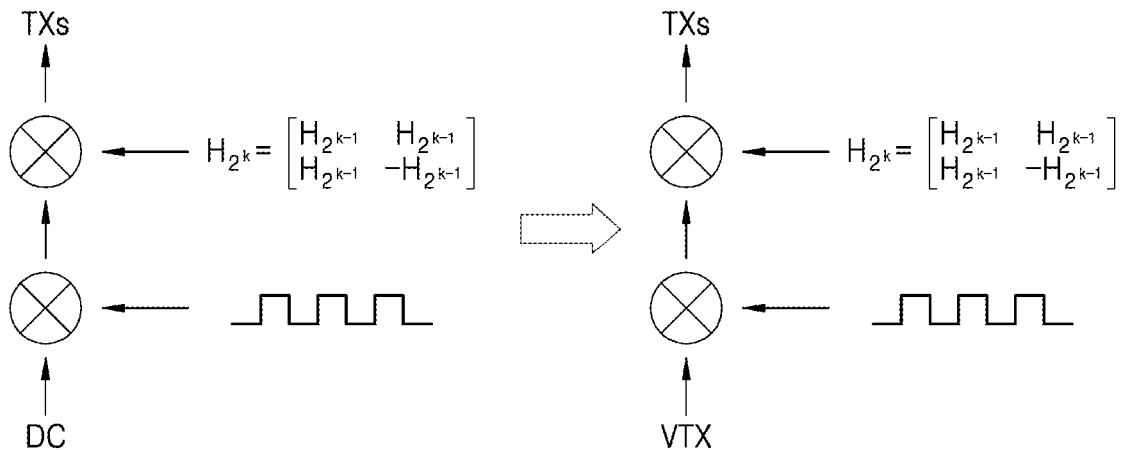
FIG. 2 is a schematic diagram of an encoder according to an example embodiment.

FIG. 2 is a schematic diagram of the encoder 211 of FIG. 1, according to an example embodiment. FIG. 2 will be described with reference to FIG. 1.

According to an example embodiment, the encoder 211 may perform a pulse modulation operation on a transmission voltage VTX. The transmission voltage VTX may be a direct-current (DC) voltage. As a result of the pulse modulation operation, a pulse having an amplitude of the transmission voltage VTX may be generated. Afterwards, the encoder 211 may encode the pulse having the amplitude of the transmission voltage VTX based on a matrix. As a result of the encoding process, the encoder 211 may generate transmission signals TXs, which are multiple signals that may be output in plural according to the size of row or column based on the matrix.

In an example embodiment, the encoder 211 may use a Hadamard matrix. According to an example embodiment, the encoder 211 may encode (and/or modulate) the pulse having the amplitude of the transmission voltage VTX based on a Hadamard matrix $H_{2^k}$.

The Hadamard matrix may be a square matrix in which all elements have a value of 1 or −1 and two row vectors are orthogonal to each other. The two orthogonal row vectors may be, for example, two arbitrary row vectors. Because the Hadamard matrix is the same as an inverse matrix thereof, the Hadamard matrix may be applied in fields of, for example, communication, which use encoding/decoding processes and/or modulation/demodulation processes.

The Hadamard matrix $H_{2^k}$ may have a Hadamard matrix $H_{2^{k-1}}$ as an element in a first row and a first column, in the first row and a second column, and in a second row and the first column and have a Hadamard matrix $-H_{2^{k-1}}$ as an element in the second row and the second column.

Hadamard matrices $H_1$, $H_2$, $H_4$, and $H_8$ may be easily derived based on the principle of the Hadamard matrix $H_{2^k}$.

For example, the Hadamard matrix $H_1$ is shown in Equation 1:

$$H_1 = [1] \qquad \text{[Equation 1]}$$

In this case, the Hadamard matrix $H_1$ may have 1 as an element.

For example, the Hadamard matrix $H_2$ is shown in Equation 2:

$$H_1 = \begin{bmatrix} 1 & 1 \\ 1 & -1 \end{bmatrix} \qquad \text{[Equation 2]}$$

In this case, the Hadamard matrix $H_2$ may have the Hadamard matrix $H_1(=1)$ as an element in a first row and a first column, in the first row and a second column, and in a second row and the first column and have a Hadamard matrix $-H_1(=-1)$ as an element in the second row and the second column.

For example, the Hadamard matrix $H_4$ is shown in Equation 3:

$$H_4 = \begin{bmatrix} 1 & 1 & 1 & 1 \\ 1 & -1 & 1 & -1 \\ 1 & 1 & -1 & -1 \\ 1 & -1 & -1 & 1 \end{bmatrix} \qquad \text{[Equation 3]}$$

That is, the Hadamard matrix $H_4$ may have the Hadamard matrix $H_2$ as an element in a first row and a first column, in the first row and a second column, and in a second row and the first column and have a Hadamard matrix $-H_2$ as an element in the second row and the second column. As a result, elements in the first row may be [1 1 1 1], elements in the second row may be [1 −1 1 −1], elements in a third row may be [1 1 −1 −1], and elements in a fourth row may be [1 −1 −1 1].

For example, the Hadamard matrix $H_8$ is shown in Equation 4:

$$H_8 = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \quad \text{[Equation 4]}$$

In this case, the Hadamard matrix $H_8$ may have the Hadamard matrix $H_4$ as an element in a first row and a first column, in the first row and a second column, and in a second row and have a Hadamard matrix $-H_4$ as an element in the second row and the second column.

Referring to all Equations 1 to 4, a Hadamard matrix H may be characterized in that all elements of a first column and a first row have a value of 1. Also, the Hadamard matrix H may be characterized in that the sum of elements of each of all the remaining rows and columns except for the first column and the first row is 0.

According to an example embodiment, voltages of transmission signals TXs generated by using the Hadamard matrix H may be reinforced at a point in time corresponding to any one column (e.g., the first column), thereby causing a high level of noise. Similarly, at the remaining points in time other than the point in time corresponding to the first column, voltages of transmission signals TXs generated by using the Hadamard matrix H may cancel each other, thereby minimizing a level of noise.

Although the present embodiment pertains to an example in which the Hadamard matrix H is used for the encoding process of the encoder 211, the inventive concepts are not limited thereto. Although the Hadamard matrix H has been applied as a representative example of a matrix in which the sum of elements of each row or each column (except for the first row and/or column) is 0, various other matrices in which the sum of elements of each row (or column) (excluding one column or row) is close to 0 may be used for an encoding operation.

Figure 3:
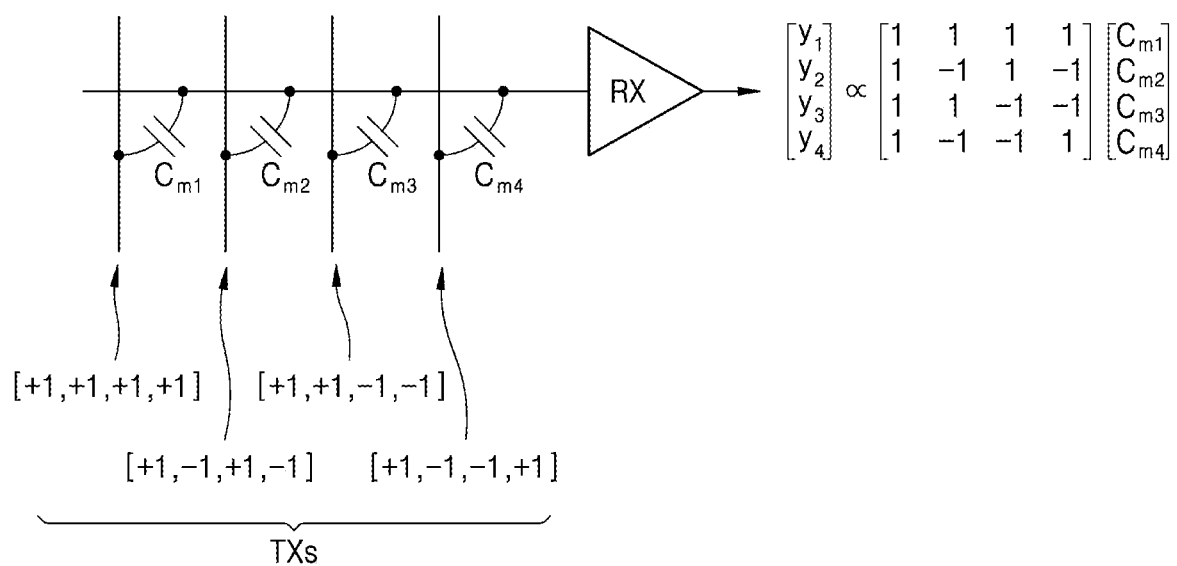
FIG. 3 is a circuit diagram of a receiving circuit according to an example embodiment.

FIG. 3 is a circuit diagram of the receiving circuit 230 of FIG. 1, according to an example embodiment. FIG. 3 will be described with reference to FIG. 1.

Referring to FIG. 3, a plurality of mutual capacitances $C_m$ (e.g., a first mutual capacitance $C_{m1}$, a second mutual capacitance $C_{m2}$, a third mutual capacitance $C_{m3}$, and a fourth mutual capacitance $C_{m4}$) may be formed between a plurality of input lines and one output line. For example, the number of mutual capacitances may equal the number of input lines.

In an example embodiment, transmission signals TXs may be applied through the plurality of input lines. The transmission signals TXs may be encoded based on the Hadamard matrix. For example, in the illustrated case including four input lines, the transmission signals TXs may be encoded based on the Hadamard matrix $H_4$. For example, at a point in time t1, the transmission signals TXs may be applied as a pulse corresponding to '1' to the four input lines. At a point in time t2, the transmission signals TXs may be respectively applied as signals '1', '−1,' '1,' and '−1' to the four input lines. Similarly, at a point in time t3, the transmission signals TXs may be respectively applied as signals '1,' '1,' '−1,' and '−1' to the four input lines. At a point in time t4, the transmission signals TXs may be respectively applied as signals '1,' '−1,' '−1,' and '1' to the four input lines.

In an example embodiment, the receiving circuit RX or 230 may receive a receiving signal (refer to RXs in FIG. 1) generated according to a change in a mutual capacitance, which is caused by touch depending on a point in time. For example, an element value of the receiving signal RXs received at the point in time t1 may be y1, and an element value of the receiving signal RXs received at the point in time t2 may be y2. Also, an element value of the receiving signal RXs received at the point in time t3 may be y3, and an element value of the receiving signal RXs received at the point in time t4 may be y4.

In an example embodiment, an inverse matrix $H_4$ of the Hadamard matrix $H_4^{-1}$ used to encode the transmission signals TXs may be adopted.

For example, elements [y1, y2, y3, y4] of the receiving signal RXs may be proportional to a matrix product of the Hadamard matrix $H_4$ and the first to fourth mutual capacitances $[C_{m1}, C_{m2}, C_{m3}, C_{m4}]$ as shown in Equation 5:

$$\begin{bmatrix} y_1 \\ y_2 \\ y_3 \\ y_4 \end{bmatrix} \propto \begin{bmatrix} 1 & 1 & 1 & 1 \\ 1 & -1 & 1 & -1 \\ 1 & 1 & -1 & -1 \\ 1 & -1 & -1 & 1 \end{bmatrix} \begin{bmatrix} C_{m1} \\ C_{m2} \\ C_{m3} \\ C_{m4} \end{bmatrix} = H_4 \cdot \begin{bmatrix} C_{m1} \\ C_{m2} \\ C_{m3} \\ C_{m4} \end{bmatrix} \quad \text{[Equation 5]}$$

Because the Hadamard matrix $H_4$ has the inverse matrix, the first to fourth mutual capacitances $[C_{m1}, C_{m2}, C_{m3}, C_{m4}]$ may be calculated based on results obtained by multiplying the inverse Hadamard matrix $H_4^{-1}$ by the elements [y1, y2, y3, y4] of the receiving signal RXs. For example, in this case, Equation 5 may be rewritten as shown in Equation 6:

$$\begin{bmatrix} C_{m1} \\ C_{m2} \\ C_{m3} \\ C_{m4} \end{bmatrix} \propto H_4^{-1} \cdot \begin{bmatrix} y_1 \\ y_2 \\ y_3 \\ y_4 \end{bmatrix} \quad \text{[Equation 6]}$$

As a result, an inverse Hadamard matrix may be used to decode the receiving signal RXs.

Although four input lines and one output line are illustrated for brevity, a Hadamard matrix having ranks corresponding to the numbers of input lines and output lines that are included in the touch panel 100 may be used.

Figure 4:
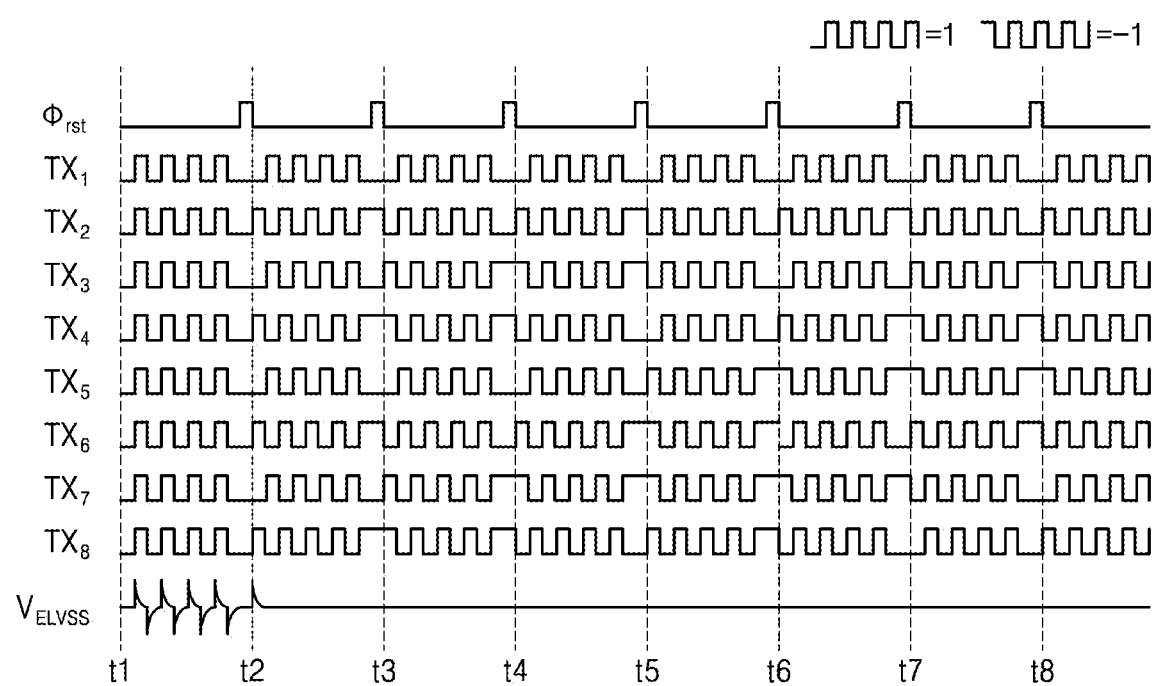
FIG. 4 is a timing diagram of transmission signals, which are applied by a transmitting circuit, and noise with respect time, according to an example embodiment.

FIG. 4 is a timing diagram of transmission signals TXs, which are applied by the transmitting circuit 210 of FIG. 1, and noise with respect time, according to an example embodiment. FIG. 4 will be described with reference to FIGS. 1 and 2.

Referring to FIG. 4, transmission signals (refer to TXs in FIG. 1), which are encoded based on a Hadamard matrix $H_8$, may be provided by transmitting circuits $TX_1$ to $TX_8$. It is assumed that eight input lines TL_1 to TL_8 are wired in the touch panel (refer to 100 in FIG. 1).

In an example embodiment, a pulse corresponding to an element '1' of a Hadamard matrix may be a positive pulse (or first polarity), which starts toggling by transitioning from 0 to 1, while a pulse corresponding to an element '−1' of the Hadamard matrix may be a negative pulse (or second polarity), which starts toggling by transitioning from 1 to 0. In this case, a positive signal of the first polarity that is the pulse corresponding to the element '1' may be opposite in phase to a negative signal of the second polarity that is the pulse corresponding to the element '−1.' However, the inventive concepts are not limited thereto, and it cannot be excluded that a negative pulse is the first polarity and a positive pulse is the second polarity. For brevity, example embodiments in which the positive pulse is fixed as the first polarity will be described.

At a point in time t1, all the transmission signals TXs may apply a pulse corresponding to '1' in response to a transition of a reset signal Φrst for horizontal scanning. In an example embodiment, all the transmission signals TXs may have the first polarity. In other words, the sum of phases of the transmission signals TXs may be greater than 0. Because eight signals having the same polarity are applied, voltages of the transmission signals TXs may all overlap, and voltage levels of the transmission signals TXs may be reinforced. Because a voltage level is proportional to ELVVS noise, display noise may be high between the point in time t1 and a point in time t2. Although an embodiment in which the transmission signals TXs has the same polarity at the point in time t1 has been described for brevity, the inventive concepts are not limited thereto. According to an example embodiment, the touch sensor 10 may be driven even when polarities or phases of the transmission signals TXs are not all the same. For example, even when the sum of phases of a plurality of transmission signals TXs are greater or less than 0, because the sum of the phases of the plurality of transmission signals TXs is not 0, the influence of noise caused by the superposition of the voltages of the transmission signals TXs may be relatively large. Hereinafter, for the unification of terms, example embodiments in which the sum of the phases of the plurality of transmission signals TXs is greater than 0 will be described.

At the point in time t2, the transmission signals TXs may be applied as signal pulses in which the first polarity is mixed with the second polarity, in response to the transition of the reset signal Φrst. Because the transmission signals TXs have been encoded based on the Hadamard matrix, voltages of the transmission signals TXs may cancel each other and approximate to 0. A voltage level of the transmission signals TXs may approximate to 0, and thus, ELVRXS noise may hardly occur.

Similarly, at points in time t3 to t8, voltage levels of transmission signals TXs due to a transition of the reset signal Φrst may approximate to 0.

Because transmission signals TXs with the sum of phases is greater than 0 are generated, from among the transmission signals TXs generated based on the Hadamard matrix, there may be a point in time at which a voltage level is high. When the voltage level is high, an overload may occur in the transmitting circuit 210, and the transmission signals TXs may be saturated.

Figure 5:
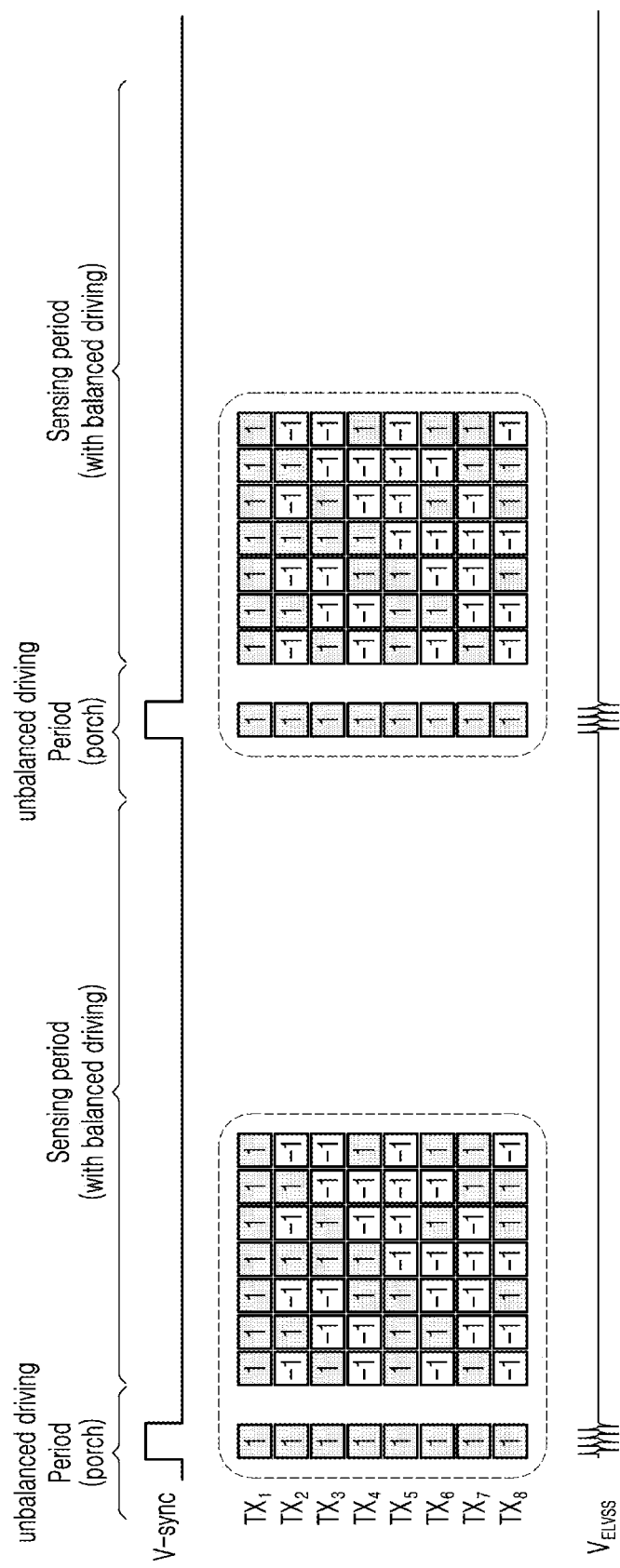
FIG. 5 is a timing diagram of points in time when transmission signals, which are encoded based on a Hadamard matrix are output, according to an example embodiment.

FIG. 5 is a timing diagram of output time points of transmission signals TXs, which are encoded based on a Hadamard matrix, according to an example embodiment. FIG. 5 will be described with reference to FIGS. 1 and 2.

Referring to FIG. 5, even when signals having phases of which the sum is greater or less than 0 are applied in the case of the generation of transmission signals (refer to TXs in FIG. 1) based on the Hadamard matrix in a capacitive touch sensor, a method of minimizing display noise will be presented.

A first column of the Hadamard matrix may correspond to transmission signals TXs provided to the touch panel (refer to 100 in FIG. 1) at a first point in time. According to an embodiment, when transmission signals TXs are output by the transmitting circuit (refer to 210 in FIG. 1) and the sum of phases of the transmission signals TXs is greater than 0, the transmission signals TXs may be included in another period other than a touch sensing period (or a display write period), and thus, display noise may be avoided. Although the first column of the Hadamard matrix is taken as an example for brevity, the same result may be obtained from a first row of the Hadamard matrix.

Before and after a transition time point of a vertical synchronous signal V-sync, which may include a synchronous signal indicating the end of one frame of a display scanning operation (or a touch sensing operation when a frame rate of the display panel 110 is equal to a frame rate of the touch panel 100) and the start of a new frame thereof, there may be a porch period in which the touch sensing operation or a display write operation is not performed. However, the inventive concepts are not limited thereto, and for example may not include the porch period and/or may encompass various embodiments that do not affect the display driving operation and, therefore, do not cause interference in a display operation.

According to an example embodiment, when all the transmission signals TXs have the same polarity (e.g., a first polarity or a second polarity) or when the sum of the phases of the transmission signals TXs is greater than 0, the transmitting circuit 210 may adjust outputs such that the transmission signals TXs are included in a porch period or a period that, for example, is irrelevant to the display driving operation. Because the porch period is a period in which the display write operation or the touch sensing operation, even when the sum of the phases of the transmission signals TXs is greater than 0, a change in a mutual capacitance Cm may not be caused.

According to an example embodiment, when outputs of the transmission signals TXs are adjusted such that a signal (or pulse) corresponding to a first column (or first row) of a Hadamard matrix $H_8$ is included in a porch period or a period that is irrelevant to a display driving operation, the remaining columns other than the first column in the Hadamard matrix $H_8$ may be balanced codes. When signals corresponding to the remaining columns are encoded as the balanced codes, voltage levels of the transmission signals TXs may approximate to 0, and thus, the occurrence of display noise may be minimized or otherwise reduced. When the transmission signals TXs are encoded using the balanced codes, the number of rising edges of the transmission signals TXs may be equal to the number of falling edges thereof.

In addition, when the balanced codes are used, the decoder 231 may perform a decoding operation on the touch sensing period.

Meanwhile, the first column (or the first row) of the Hadamard matrix $H_8$, which is included in the porch period or the period irrelevant to the display driving operation, may be referred to as an unbalanced code. When the unbalanced code is used, the decoder 231 may not be performed the decoding operation on the touch sensing period.

Although a method of inducing the balanced codes by using the Hadamard matrix has been described, the Hadamard matrix may not be necessarily used. When any arbitrary matrix other than the Hadamard matrix is divided into columns (or rows) having a relatively large number of offsets and columns (or rows) having a relatively small number of offsets, has an inverse matrix, and is a square matrix in which all elements are divided into 1 and −1, similar effects may be obtained. In this case, for example, when the transmission signals TXs are output such that a point in time corresponding to a column having a relatively large number of offsets is included in the porch period of the touch sensor 10 or the period irrelevant to the display driving operation, display interference may be inhibited in a similar manner to a case in which the Hadamard matrix is used.

As panels become larger and ultrathin, display interference due to touch driving is increasing. A high-voltage transmission driving scheme and/or a multi-channel driving scheme is being used to improve a reduction in touch sensitivity caused by a display common electrode. However, the high-voltage transmission driving scheme may cause coupling due to a high voltage, while the multi-channel driving scheme may have difficulty in controlling multi-line switching.

To reduce noise caused by constructive superposition of signals, transmission signals encoded based on a matrix that makes the sum of elements of a row or column close to zero (0) may be used. However, because a matrix in which the sum of elements of all rows or columns is 0 has no inverse matrix, the matrix may be difficult to decode. In Hadamard matrices, the sum of elements of the remaining rows or columns, except for a first row or column, may be 0. However, the Hadamard matrices may have a problem in that an offset for the first row or column increases.

The touch sensor 10 may adjust the output of signals such that a point in time corresponding to a column having a relatively large number of offsets, from among a matrix for encoding the transmission signals TXs, is included in a porch period of the touch sensor 10 (or a period irrelevant to a display driving operation). Thus, display interference caused by a display common electrode may be prevented, and touch sensitivity may be improved.

Figure 6:
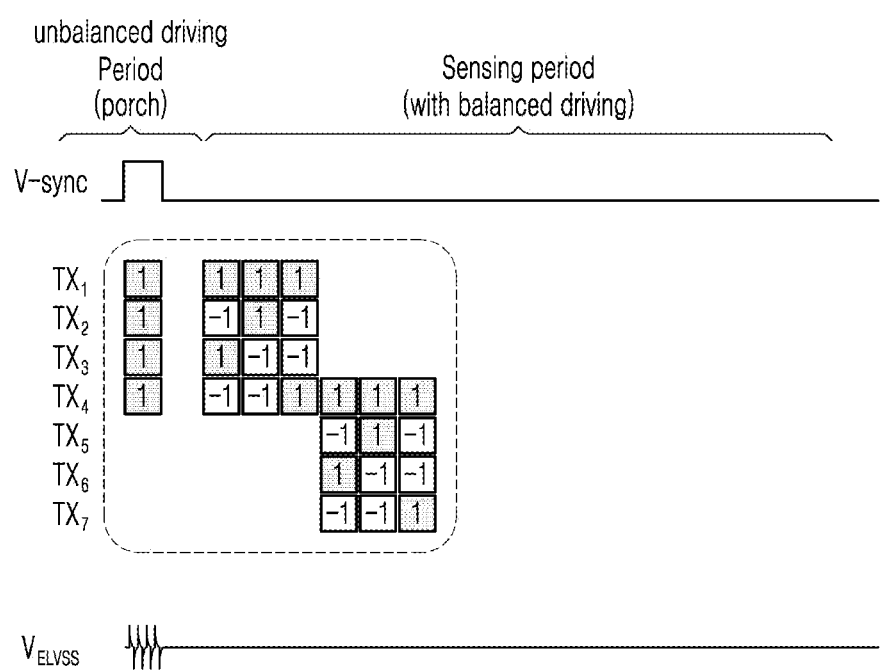
FIG. 6 is a timing diagram showing time points at which some of transmission signals encoded based on a Hadamard matrix are overlapped and output, according to an example embodiment.

FIG. 6 is a timing diagram showing time points at which some of transmission signals TXs encoded based on a Hadamard matrix are overlapped and output, according to an example embodiment. FIG. 6 will be described with reference to FIGS. 1, 2, and 3.

When the number of input lines included in the touch panel (refer to 100 in FIG. 1) is not a power of 2, a Hadamard matrix $2^k$, which is a square matrix and has $H_{2^k}$ rows and columns, may not be used as it is.

According to an example embodiment, when the number of input lines is greater than $2^N$ and less than $2^{N+1}$ the transmitting circuit (refer to 210 in FIG. 1) may encode transmission signals TXs based on a matrix generated by partially overlapping a first Hadamard sub-matrix having $2^N$ rows and $2^N$ columns with a second Hadamard sub-matrix. Here, N may be a natural number.

For example, when 7 input lines are wired in the touch panel 100, because a largest power of 2 less than 7 is 4, a 4×4 Hadamard matrix $H_4$ may be used.

In an example embodiment, when 7 input lines are provided, the Hadamard matrix $H_4$ may cover some transmitting circuits (e.g., $TX_1$ to $TX_4$). The remaining transmitting circuits TX5 to TX7, which are not covered by the Hadamard matrix $H_4$ may overlap two same Hadamard matrices $H_4$ to overlap only one element '1.'

The sum of offsets that occur in an unbalanced period (e.g., a porch period, or a period irrelevant to a display driving operation) is only '4,' and thus, an absolute magnitude of display noise (e.g., ELVRXS noise) may be less than in FIG. 6.

As a result, by overlapping two Hadamard matrix (e.g., $H_4$) having $2^N$ (e.g., four rows (or columns)), display interference may be also prevented from occurring in the touch panel 100 in which the number of input lines is not $2^k$ similar to FIG. 6.

FIG. 7 depict numerical expressions representing matrices for decoding a receiving signal RXs by using the method of FIG. 6, according to an example embodiment. FIG. 7 will be described with reference to FIGS. 1 and 6.

Referring to FIG. 7, because the transmission signals TXs are encoded based on the Hadamard matrix $H_4$, the receiving signal RXs may have four elements [y1, y2, y3, y4]. For example, the element y1 may be proportional to ($C_{m1}+C_{m2}+C_{m3}+C_{m4}$), and the element y4 may be proportional to ($C_{m1}-C_{m2}-C_{m3}+C_{m4}$). As a result, first to fourth mutual capacitances [$C_{m1}$, $C_{m2}$, $C_{m3}$, $C_{m4}$] may be calculated based on a result obtained by multiplying an inverse Hadamard matrix $H_4^{-1}$ by the receiving signal RXs [y1, y2, y3, y4].

The calculated fourth mutual capacitance $C_{m4}$ may be used to calculate fifth to seventh mutual capacitances [$C_{m5}$, $C_{m6}$, $C_{m7}$]. Because the receiving signal [y5, y6, y7] includes an equation for the already calculated fourth mutual capacitance $C_{m4}$, the equation for the fourth mutual capacitance $C_{m4}$ may be separated by using the separation of variables.

As a result, the fourth mutual capacitance $C_{m4}$ may be a value of a mutual capacitor located in an area where two Hadamard matrices $H_4$ overlap each other.

Figure 8:
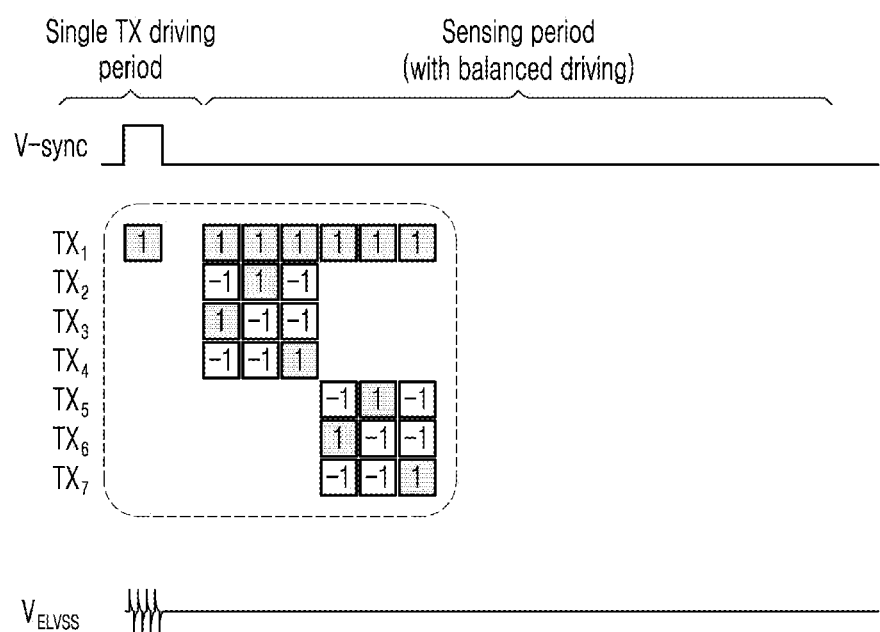
FIG. 8 is a timing diagram showing time points at which a single polarity signal and some of transmission signals encoded based on a Hadamard matrix are output, according to an example embodiment.

FIG. 8 is a timing diagram of points in time at which a single polarity signal and some of transmission signals TXs encoded based on a Hadamard matrix are output, according to an example embodiment. FIG. 8 will be described with reference to FIGS. 1 and 6.

Referring to FIG. 8, because the touch panel (refer to 100 in FIG. 1) includes seven input lines, the timing diagram of FIG. 8 may be similar to the diagram of FIG. 7 in that a Hadamard matrix $H_4$ for 4, which is a power of 2 and less than 7, is used. However, in FIG. 8, a single driving scheme may be used to obtain a first mutual capacitance $C_{m1}$.

According to an example embodiment, when the number of input lines is greater than $2^N$ (N is a natural number) and less than $2^{N+1}$ the transmitting circuit (refer to 210 in FIG. 1) may provide a single polarity signal having only a first polarity or a second polarity to the first input line (refer to TL_1 in FIG. 1), provide the plurality of transmission signals TXs, which are based on a Hadamard sub-matrix, to the remaining input lines TL_2 to TL_7 except the first input line TL_1, and encode the transmission signals TXs based on the generated matrix.

In an example embodiment, even when the single driving scheme is applied to the first input line TL_1 and a multi-driving scheme is applied to the second to seventh input lines TL_2 to TL_7, the Hadamard sub-matrix, which is a subset of the Hadamard matrix $H_4$, may be used to cover all input lines. For example, the Hadamard sub-matrix may be [−1 1 −1; −1 1 −1; 1 −1 −1].

In an example embodiment, the Hadamard sub-matrix may cover the second to fourth input lines TL_2 to TL_4. Similarly, the Hadamard sub-matrix may cover the fifth to seventh input lines TL_5 to TL_7.

As a result, by using two Hadamard sub-matrices having three rows (or columns), display interference may be also prevented from occurring in the touch panel 100 in which the number of input lines is not $2^k$, similar to FIG. 6.

In addition, by covering the first input line TL_1 using a single driving scheme, the sum of the offsets that occur in an unbalanced period (g., a porch period or a period irrelevant to a display driving operation) is only '3,' and thus, an absolute magnitude of display noise (e.g., ELVRXS noise) may also be less than that shown in FIG. 6 or 7.

Although it is assumed in FIG. 8 that the single driving scheme is used to obtain the first mutual capacitance $C_{m1}$, the inventive concepts are not limited thereto. For example, the method of obtaining mutual capacitances is not specifically limited and may include any method of obtaining one capacitance, for example, a single driving scheme, a multi-driving scheme, and/or a self-capacitive sensing scheme.

FIG. 9 depicts numerical expressions representing matrices for decoding a receiving signal RXs by using a method of FIG. 8, according to an example embodiment.

Referring to FIG. 9, because a single driving scheme is used, the first mutual capacitance $C_{m1}$ may be directly calculated from an element y1 of a receiving signal RXs.

In an example embodiment, transmission signals TXs may be encoded based on the Hadamard matrix $H_4$ with four rows. Because the first mutual capacitance $C_{m1}$ has already been calculated, variables may be separated from three elements [y2, y3, y4] of the receiving signal RXs.

As a result, the second to fourth mutual capacitances [$C_{m2}$, $C_{m3}$, $C_{m4}$] may be calculated based on a result obtained by multiplying an inverse matrix of the Hadamard sub-matrix by a matrix obtained by subtracting the first mutual capacitance $C_{m1}$ from the elements [y2, y3, y4] of the receiving signal RXs.

Similarly, the fifth to seventh mutual capacitances [$C_{m1}$, $C_{m5}$, $C_{m6}$] may be calculated using the calculated first mutual capacitance $C_{m7}$.

According to an example embodiment, transmission signals TXs may be encoded based on the Hadamard matrix $H_4$ with four rows. Because the first mutual capacitance $C_{m1}$ has already been calculated, variables may be separated from three elements [y5, y6, y7] of the receiving signal RXs. Based on a principle similar to that of FIG. 9B, the fifth to seventh mutual capacitances [$C_{m5}$, $C_{m6}$, $C_{m7}$] may be calculated based on a result obtained by multiplying the inverse matrix of the Hadamard sub-matrix by a matrix obtained by subtracting the first mutual capacitance $C_{m1}$ from the elements [y5, y6, y7] of the receiving signal RXs.

Figure 10:
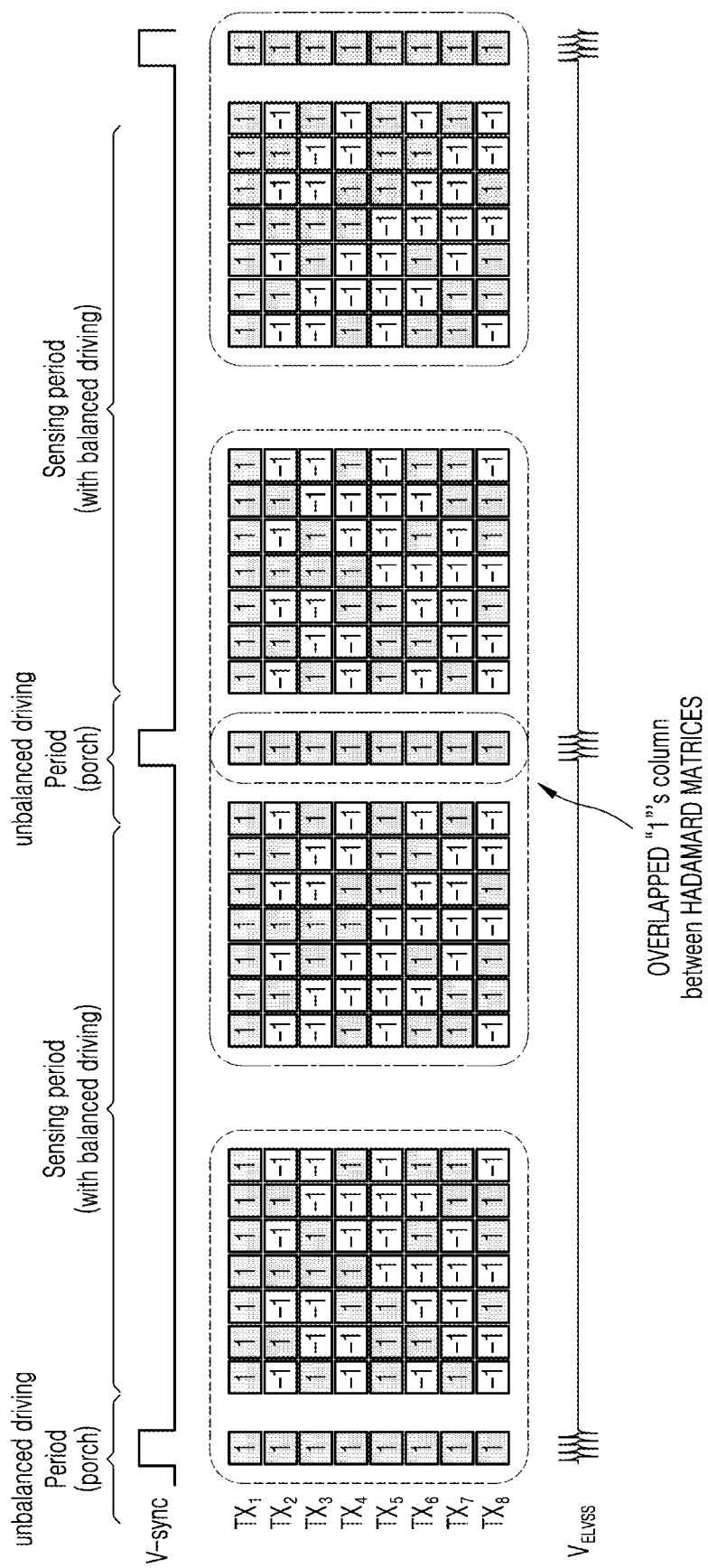
FIG. 10 is a timing diagram showing time points at which some of transmission signals encoded based on a Hadamard matrix are overlapped and output according to an example embodiment.

FIG. 10 is a timing diagram showing time points at which some of transmission signals encoded based on a Hadamard matrix are overlapped and output, according to an example embodiment. FIG. 10 will be described with reference to FIG. 1.

FIG. 10 illustrates a case in which a frame rate of the touch panel (refer to 100 in FIG. 1) is twice higher than a frame rate of the display panel (refer to 110 in FIG. 1). For ease of description, below, the touch panel 100 is described as having a power of 2 input lines (e.g., 8 input lines).

According to an example embodiment, the transmitting circuit (refer to 210 in FIG. 1) may generate transmission signals TXs based on a Hadamard matrix $H_8$ and an 8×15 symmetric Hadamard matrix. Here, the 8×15 symmetric Hadamard matrix may be obtained by overlapping the Hadamard matrix $H_8$ with a row or column of which the sum of elements is not 0 in a matrix, which is symmetric to the Hadamard matrix $H_8$ with respect to a y-axis. In this case, elements in a ninth column (e.g., at the center of the symmetric Hadamard matrix) may include only '1,' and transmission signals TXs corresponding to the ninth column may be output as pulses including only a first polarity or a second polarity.

In an example embodiment, because the frame rate of the display panel 110 is half of the frame rate of the touch panel 100, a transition of a vertical synchronous signal V-sync may occur at a point in time when two Hadamard matrices $H_8$ appear. According to an example embodiment, there may be porch periods (e.g., a back porch period and a front porch period) before and after the transition of the vertical synchronous signal V-sync. The transmitting circuit 210 may adjust output time points such that pulses having only the first polarity or the second polarity are output during the porch period of the vertical synchronous signal V-sync.

Figure 11:
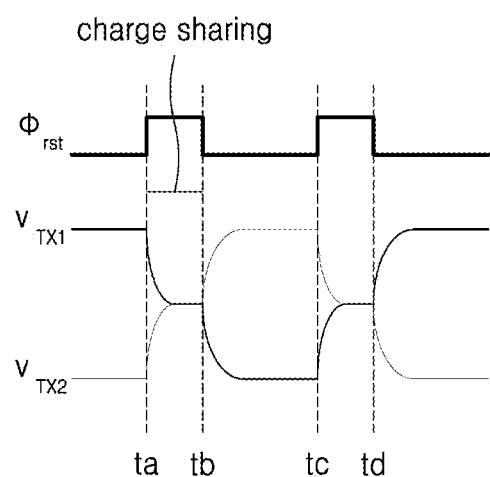
FIG. 11 is a graph of voltages in a transmitting circuit according to an example embodiment.

FIG. 11 is a graph of voltages in the transmitting circuit 210 of FIG. 1, according to an example embodiment. FIG. 11 will be described with reference to FIGS. 1 and 5.

Referring to FIG. 11, transmitting circuit voltages Vtx1 and Vtx2 may make transitions during a logic-high level period of a reset signal Φrst.

A switch controlled in response to the reset signal Φrst for horizontal scanning may be connected to the transmitting circuit (refer to 210 in FIG. 1). The switch may be turned on (or open) when the reset signal Φrst is at a logic-low level. When the reset signal Φrst transitions from the logic-low level to a logic-high level, the switch may be turned off (or short). While the reset signal Φrst is maintained at the logic-high level, the switch may remain turned off. When the reset signal Φrst transitions from the logic-high level to the logic-low level, the switch may be turned on again.

According to an example embodiment, from among pulses output by transmission signals TXs encoded based on a Hadamard matrix, except for a pulse corresponding to a first column of the Hadamard matrix, the number of pulses having a first polarity may be equal to the number of pulses having a second polarity. Accordingly, the transmitting circuit 210 may be configured such that the numbers of pulses having different polarities have a one-to-one correspondence not only between adjacent input lines but also between input lines that are not adjacent to each other, and thus, charge sharing may occur between the input lines.

For example, transmission signals TXs applied through a first input line TL_1 may transition from the first polarity (e.g., '1') to the second polarity (e.g., '−1') in response to the next reset signal Φrst, and transmission signals TXs applied through a second input line TL_2 may transition from the second polarity (e.g., '−1') to first polarity (e.g., '1') in response to the next reset signal Φrst. In this case, voltages of the transmission signals TXs applied through the first input line TL_1 may not need to drop to 0, voltages of the transmission signals TXs applied through the second input line TL_2 may not need to rise to the maximum value, and charges may be shared at a middle point. Here, the first input line TL_1 may not need to be immediately adjacent to the second input line TL_2.

As a result, power consumption due to frequent transitions may be reduced by up to half.

Figure 12:
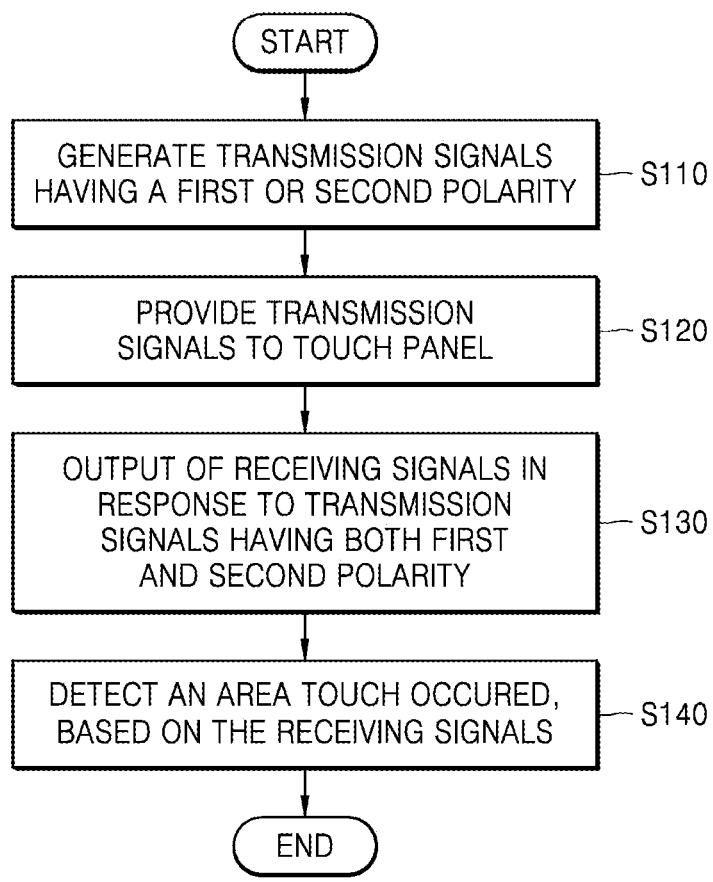
FIG. 12 is a flowchart of a touch sensing method according to an example embodiment.

FIG. 12 is a flowchart of a touch sensing method according to an example embodiment.

FIG. 12 will be described with reference to FIG. 1. In operation S110, the touch sensor (refer to 10 in FIG. 1) may generate transmission signals TXs, each of which has a first polarity or a second polarity that is opposite in phase to the first polarity. The transmission signals TXs may be generated at an analog front end (AFE) (not shown), and may be encoded based on the Hadamard matrix.

In operation S120, the transmission signals TXs may be provided to the touch panel (refer to 100 in FIG. 1). For example, the touch panel 100 may include a plurality of input lines TL_1 to TL_M and a plurality of output lines RL_1 to RL_N. The transmission signals TXs may be provided through the plurality of input lines TL_1 to TL_M.

In operation S130, in response to a situation in which at least one of the transmission signals TXs has the first polarity and at least one of the transmission signals TXs has the second polarity, the touch sensor 10 may output receiving signals RXs based on changes in a mutual capacitances Cm, which are caused between the input lines TL_1 to TL_M and the output lines RL_1 to RL_N due to touch.

In operation S140, the touch sensor 10 (e.g., via the control logic) may calculate the mutual capacitance Cm based on the receiving signal RXs and detect a touched area on the touch panel 100.

Figure 13:
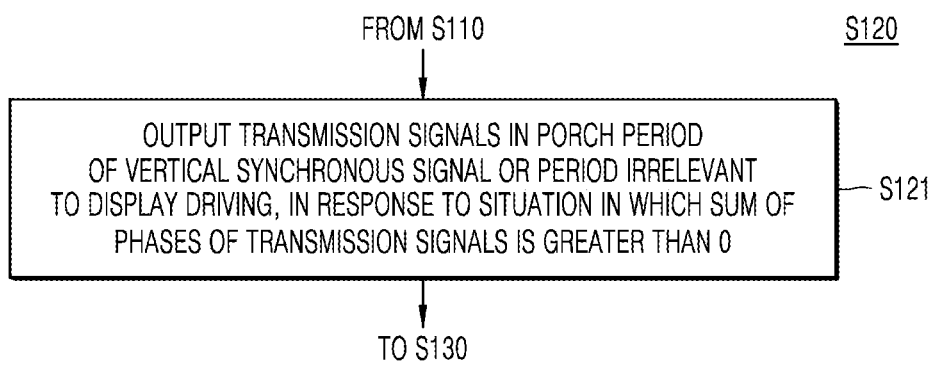
FIG. 13 is a flowchart of a touch sensing method according to an example embodiment.

FIG. 13 is a flowchart of a touch sensing method according to an example embodiment.

FIG. 13 will be described with reference to FIG. 1. In operation S121 after operation S110, in response to a situation in which the sum of phases of transmission signals TXs is greater than 0, the transmitting circuit (refer to 210 in FIG. 1) may output the transmission signals TXs to be included in a porch period a vertical synchronous signal V-sync or a period irrelevant to a display driving operation.

A pulse in a case in which the sum of the phases of the transmission signals TXs is greater than 0 may correspond to an output value for a column of which all elements are 1 in the Hadamard matrix for encoding the transmission signals TXs.

Figure 14:
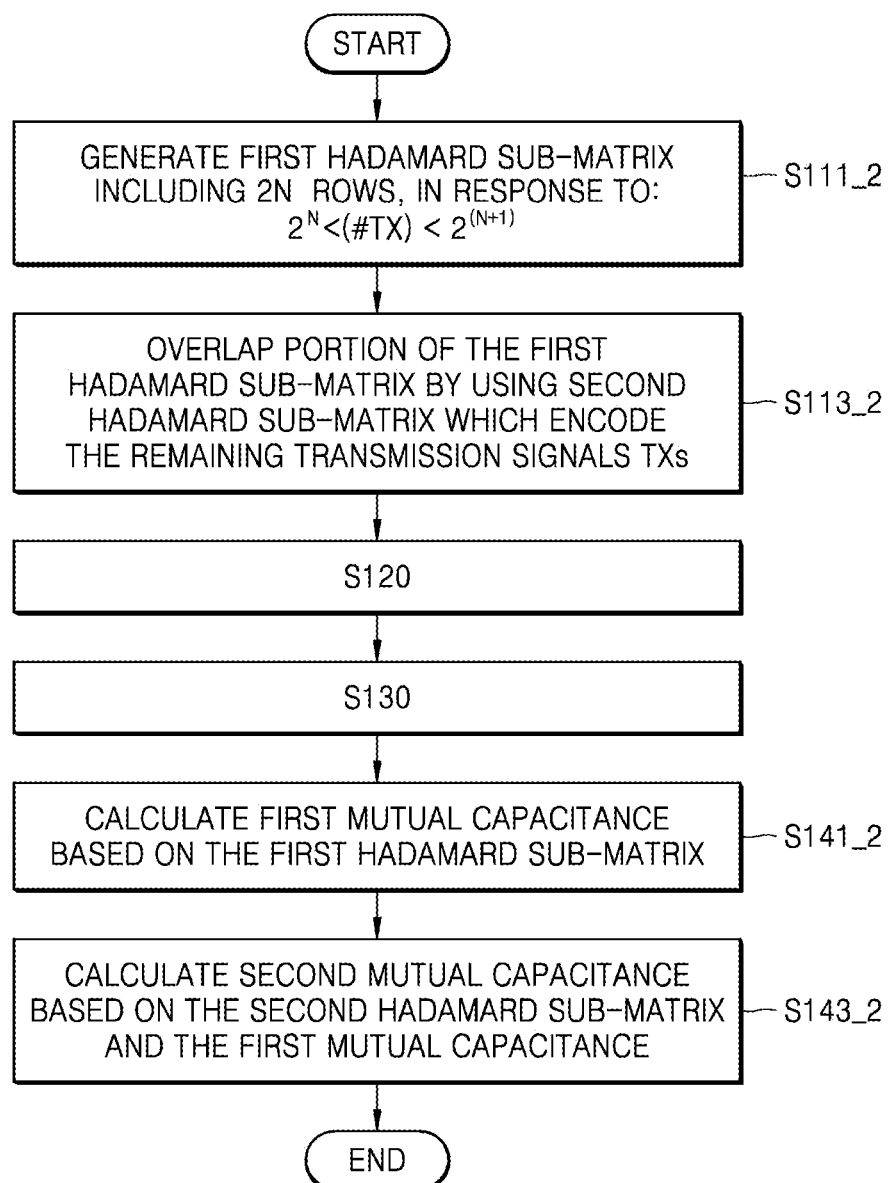
FIG. 14 is a flowchart of a touch sensing method according to an example embodiment.

FIG. 14 is a flowchart of a touch sensing method according to an example embodiment.

FIG. 14 will be described with reference to FIG. 1. In operation S111_2, the touch sensor (refer to 10 in FIG. 1) may generate a first Hadamard sub-matrix, which is a subset of the Hadamard matrix and includes $2^N$ rows in response to a situation in which the number of input lines is greater than $2^N$ and less than $2^{N+1}$.

In operation S113_2, the touch sensor (refer to 10 in FIG. 1) may generate a second Hadamard sub-matrix, which is configured to encode the remaining transmission signals TXs other than transmission signals encoded by the first Hadamard sub-matrix, from among the transmission signals TXs, and overlap a portion of another first Hadamard sub-matrix. Afterwards, operation S120 may be performed.

Moreover, in operation S141_2 after operation S130, control logic of the touch controller (refer to 200 in FIG. 1) may calculate a first mutual capacitance based on the first Hadamard sub-matrix.

In operation S143_2, the control logic may calculate a second mutual capacitance based on the second Hadamard sub-matrix and the first mutual capacitance.

Figure 15:
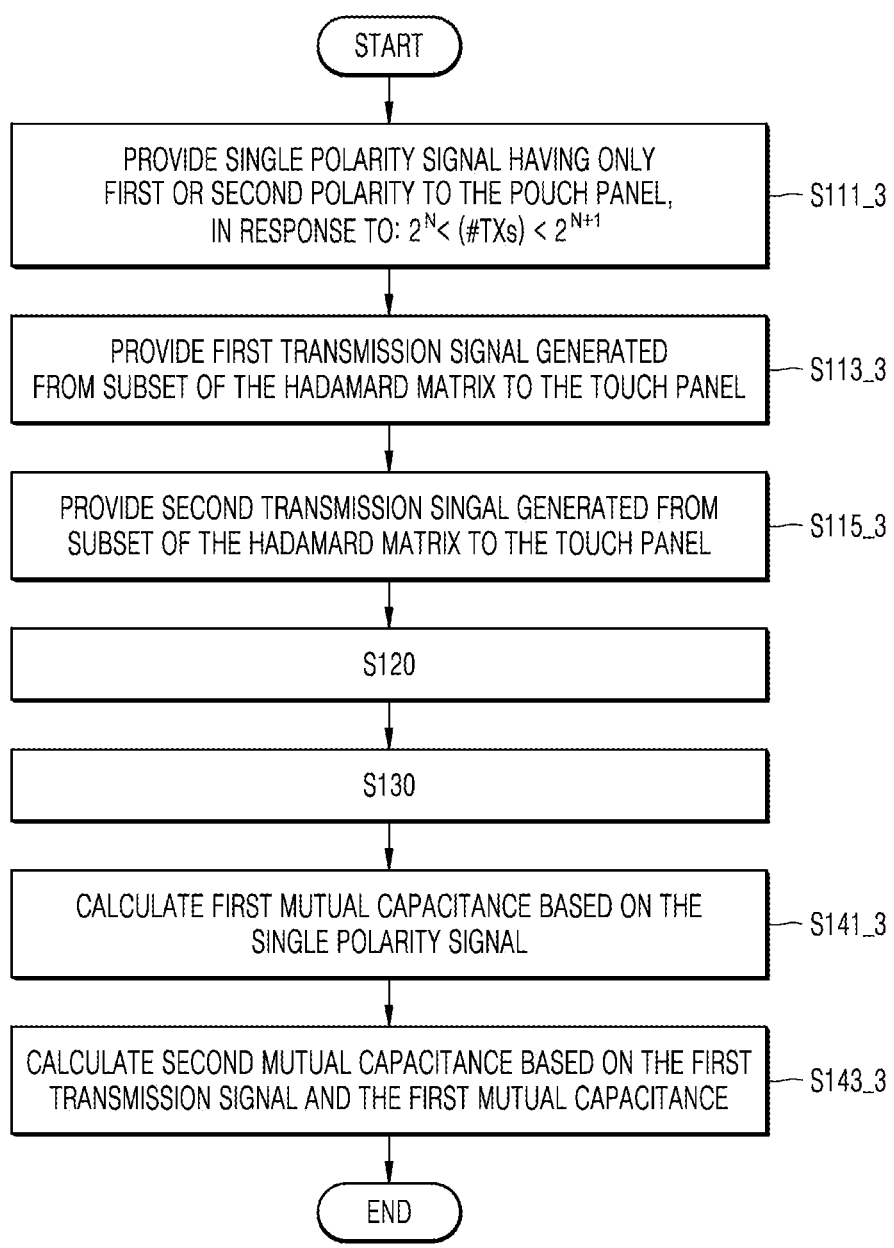
FIG. 15 is a flowchart of a touch sensing method according to an example embodiment.

FIG. 15 is a flowchart of a touch sensing method according to an example embodiment.

FIG. 15 will be described with reference to FIG. 1. In operation S111_3, in response to a situation in which the number of transmission signals TXs is greater than $2^N$ and less than $2^{N+1}$, the touch sensor (refer to 10 in FIG. 1) may provide a single polarity signal having only a first polarity or a second polarity to the touch panel 100.

In operation S113_3, the touch sensor 10 may provide a first transmission signal generated from a subset of the Hadamard matrix to the touch panel 100.

In operation S115_3, the touch sensor 10 may provide a second transmission signal generated from the subset to the touch panel 100.

Thereafter, operation S120 may be performed.

Moreover, in operation S141_3 after operation S130, a control logic of the touch controller (refer to 200 in FIG. 1) may calculate the first mutual capacitance based on the single polarity signal.

In operation S143_3, the control logic may calculate a second mutual capacitance based on the first transmission signal and the first mutual capacitance.

Figure 16:
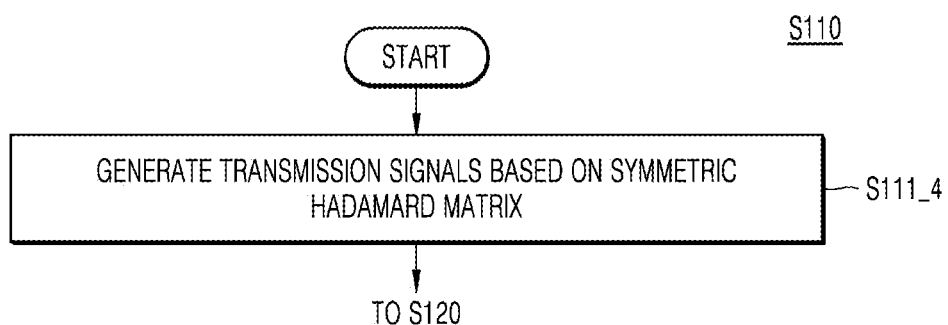
FIG. 16 is a flowchart of a touch sensing method according to an example embodiment.

FIG. 16 is a flowchart of a touch sensing method according to an example embodiment.

FIG. 16 will be described with reference to FIG. 1. In operation S111_4, the touch sensor (refer to 10 in FIG. 1) may generate transmission signals TXs, based on a symmetric Hadamard matrix. Here, the symmetric Hadamard matrix may be obtained by overlapping the Hadamard matrix with an area having a common row or column of which the sum of elements is not 0 in a matrix, which is symmetric to the Hadamard matrix with respect to a y-axis. Afterwards, operation S120 may be performed.

Figure 17:
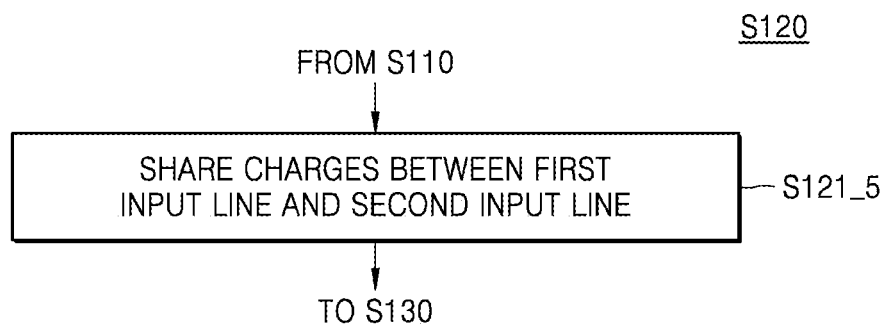
FIG. 17 is a flowchart of a touch sensing method according to an example embodiment.

FIG. 17 is a flowchart of a touch sensing method according to an example embodiment.

FIG. 17 will be described with reference to FIG. 1. In operation S121_5, in the touch sensor (refer to 10 in FIG. 1), a first input line TL_1 configured to transmit a first transmission signal having a first polarity may share charges with a second input line TL_2 configured to transmit a second transmission signal having a second polarity.

Figure 18:
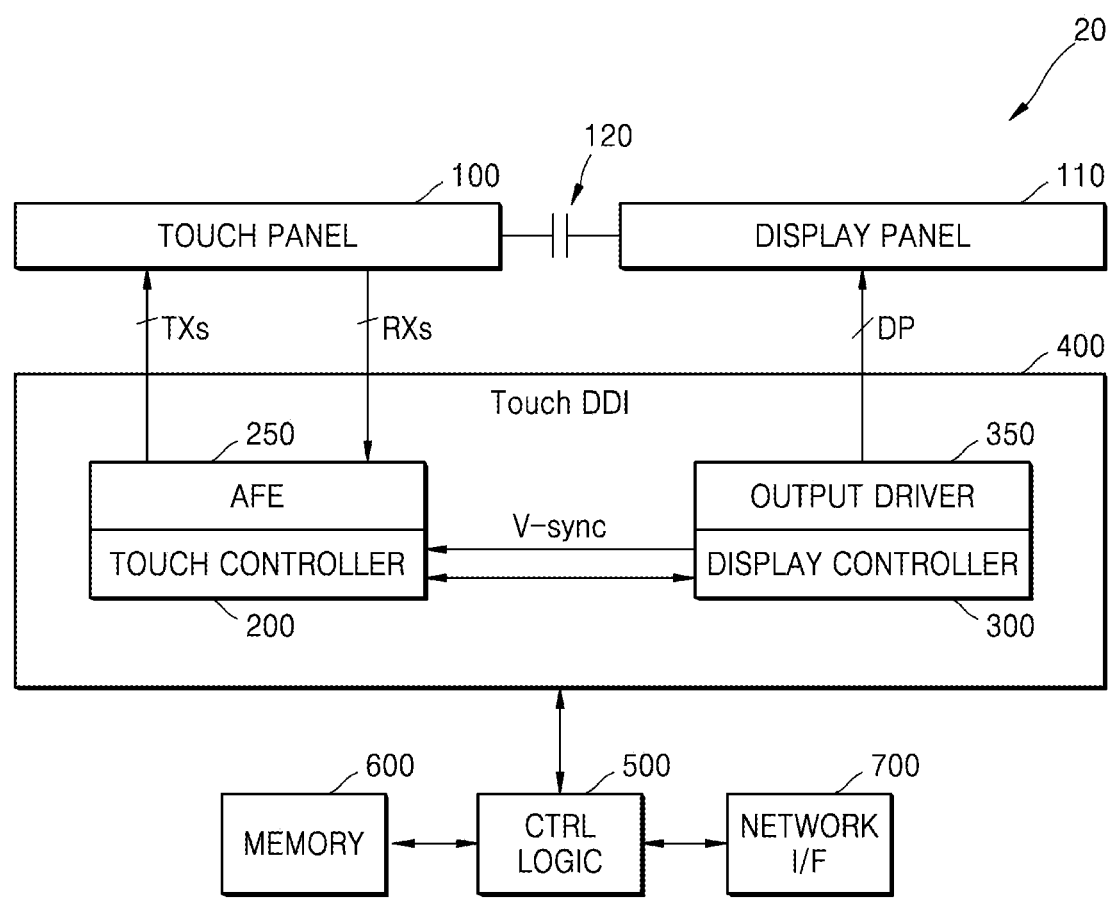
FIG. 18 is a block diagram of a touch sensor according to an example embodiment.

FIG. 18 is a block diagram of a touch sensor 20 according to an example embodiment. The touch sensor 20 may include a touch panel 100, a display panel 110, a parasitic capacitor 120 caused between the touch panel 100 and the display panel 110, and a touch display driver integrated circuit (DDI) 400.

The touch DDI 400 may include a touch controller 200, an analog front-end (AFE) 250, a display controller 300, and an output driver 350. The touch DDI 400 may be, for example, mounted as one chip. For example, as compared to FIG. 1, FIG. 18 illustrates an embodiment in which a touch sensor and a display driver circuit are embodied as one chip. Descriptions of the touch panel 100, the display panel 110, and the parasitic capacitor 120, which are the same as in FIG. 1, will be omitted.

The AFE 250 may include a plurality of connected channels including a plurality of input lines TL_1 to TL_M and a plurality of output lines RL_1 to RL_N and may be configured to receive current through each of the channels. The AFE 250 may process the current and output a digital signal.

The display controller 300 and the output driver 350 may operate as a display driver circuit as a whole. According to an example embodiment, the display controller 300 may include a memory (not shown) and a display control logic (not shown).

According to an example embodiment, the display control logic may adjust all functions by using a control signal such that processed data is displayed, and provide buffering for outputs by storing the processed data in a memory. The output driver 350 may provide a display signal DP to the display panel 110.

According to an example embodiment, the output driver 350 may include a source driver (not shown) and a gate driver (not shown). According to an example embodiment, the output driver 350 may generate data for driving the display panel 110 in response to the control signal output by the display control logic. According to an example embodiment, the source driver may receive required information, such as corrected clock signals CALCK, from the touch controller 200. The output driver 350 may sequentially scan gate lines of the display panel 110 in response to the output signal output by the display control logic. Example operations of the output driver 350 will be described with reference to FIG. 1. A control logic 500 may execute commands stored in the memory and control all operations of the touch sensor and a display. For example, the control logic 500 may calculate touch coordinates based on the digital signal output by the AFE 250. In addition, the control logic 500 may directly receive timing control signals (e.g., a horizontal synchronous signal H-sync and a vertical synchronous signal V-sync) through a host controller or the display controller 300. Furthermore, the control logic 500 may provide image data to the display panel 110, recognize an external input based on the image data output to the display panel 110 and a detected touch, and perform at least one predetermined function in response to the external input. In some embodiments, the control logic 500 may be a System-on-Chip (SoC) including a processor, a bus, and a function block and may also be referred to as an application processor (AP).

A memory 600 may store the digital signal output by the AFE 250 and display data. A control logic (500) may generate timing control signals (e.g., a horizontal synchronous signal and a vertical synchronous signal Vsync) for controlling a source driver (not shown) and a gate driver (not shown).

The memory 600 may be accessed by a control logic (500). For example, the memory 600 may include a non-volatile memory or a volatile memory. Non-volatile memories may include electrically erasable programmable read-only memory (EEPROM), flash memory, phase-change RAM (PRAM), resistive RAM (RRAM), nano-floating gate memory (NFGM), polymer RAM (PoRAM), magnetic RAM (MRAM), and/or ferroelectric RAM (FRAM). The volatile memories may include dynamic RAM (DRAM), static RAM (SRAM), mobile DRAM, double-data-rate (DDR) synchronous DRAM (SDRAM), low-power DDR (LPDDR) SDRAM, graphic DDR (GDDR) SDRAM, and/or rambus DRAM (RDRAM).

A network interface 700 may provide an interface for an external network to the control logic 500. For example, the network interface 700 may be connected to a wired and/or a wireless network and transmit a signal from the network to the control logic 500 and/or transmit a signal from the control logic 500 to the network.

While the inventive concepts have been particularly shown and described with reference to some example embodiments thereof, it will be understood that various changes in form and details may be made therein without departing from the spirit and scope of the following claims.

What is claimed is:

1. A touch sensor of a multi-driving scheme, the touch sensor comprising:
    a touch panel comprising a plurality of input lines and a plurality of output lines on a surface of a display panel, the touch panel configured to cause a change in a mutual capacitance in response to a touch; and
    processing circuitry configured to
        generate a plurality of transmission signals to the plurality of input lines as a result of an encoding operation on a first matrix having an inverse matrix, each of the transmission signals having a first polarity or a second polarity, the second polarity including an opposite phase to the first polarity,
        output the plurality of transmission signals in porch periods of a display driving operation of the display panel when a sum of phases of the plurality of transmission signals is greater than 0,
        receive a plurality of receiving signals through the plurality of output lines, and
        decode the plurality of receiving signals based on the first matrix, the plurality of receiving signals generated by the change in the mutual capacitance in response to the touch,
        wherein the plurality of receiving signals include signals corresponding to the plurality of transmissions signals output during the porch periods of the display driving operation,
    wherein the first matrix is a Hadamard matrix,
    wherein the plurality of input lines is greater than 2N and less than 2N+1, wherein N is a natural number, and
    the processing circuitry is further configured to
        provide a single polarity signal having only the first polarity or the second polarity to a first input line of the plurality of input lines,
        provide the plurality of transmission signals to a remainder of the input lines, the plurality of transmission signals being based on a third Hadamard sub-matrix,
        determine a third mutual capacitance based on the single polarity signal, and
        determine a fourth mutual capacitance based on the third Hadamard sub-matrix and the third mutual capacitance.

2. The touch sensor of claim 1, wherein
the plurality of transmission signals comprise a first transmission signal having the first polarity and a second transmission signal having the second polarity, and
the processing circuitry is further configured to perform the decoding upon receiving the first transmission signal and the second transmission signal.

3. The touch sensor of claim 1, wherein
the plurality of transmission signals comprise a first transmission signal having the first polarity and a second transmission signal having the second polarity, and
the first transmission signal and the second transmission signal being received in a sensing period of the touch panel include a number of rising edges equal to a number of falling edges of the plurality of transmission signals.

4. The touch sensor of claim 1, wherein the processing circuitry is further configured to encode a pulse-modulated signal based on the first matrix.

5. The touch sensor of claim 1, wherein
transmission signals corresponding to rows or columns of which a sum of elements is not 0 in the Hadamard matrix are output in the porch periods, and
transmission signals corresponding to rows or columns of which the sum of elements is 0 are output in a sensing period of the touch panel.

6. The touch sensor of claim 1, wherein
the plurality of input lines is greater than $2^N$ and less than $2^{N+1}$, wherein N is a natural number,
the processing circuitry is configured to provide the plurality of transmission signals, the plurality of transmission signals being generated by partially overlapping a first Hadamard sub-matrix having $2^N$ rows and $2^N$ columns with a second Hadamard sub-matrix, and to determine a first mutual capacitance based on the first Hadamard sub-matrix and determine a second mutual capacitance based on the second Hadamard sub-matrix and the first mutual capacitance.

7. The touch sensor of claim 1, wherein, when a frame rate of the touch panel is twice a frame rate of the display panel, the processing circuitry is configured to generate the plurality of transmission signals based on a fourth Hadamard matrix and a symmetric Hadamard matrix, the symmetric Hadamard matrix being obtained by overlapping the fourth Hadamard matrix with a row or column of which a sum of elements is not 0 in a matrix symmetric to the fourth Hadamard matrix with respect to a y-axis.

8. The touch sensor of claim 1, wherein
the plurality of transmission signals comprise a first transmission signal having the first polarity and a second transmission signal having the second polarity, and
in the first transmission signal and the second transmission signal being received in a sensing period of the touch panel charges are shared between a first input line, of the plurality of input lines configured to transmit the first transmission signal and a second input line, of the plurality of input lines, configured to transmit the second transmission signal.

9. A touch sensing method of a multi-driving scheme, the method comprising:
generating a plurality of transmission signals, each transmission signal having a first polarity or a second polarity, the second polarity including an opposite phase to the first polarity;
providing the plurality of transmission signals to a touch panel, the touch panel including input lines and output lines;
generating a plurality of receiving signals based on a change in a mutual capacitance in the touch panel caused by a touch between the input lines and the output lines;
outputting the plurality of receiving signals in response to at least one of the plurality of transmission signals having the first polarity and at least one of the plurality of transmission signals having the second polarity; and
detecting an area in which the touch occurred on the touch panel by determining the mutual capacitance based on the plurality of receiving signals,
wherein the touch panel is on a surface of a display panel,
wherein the plurality of receiving signals include signals corresponding to the plurality of transmissions signals output during a porch periods of a display driving operation of the display panel,
wherein the generating of the plurality of transmission signals comprises encoding the plurality of transmission signals based on a Hadamard matrix,
wherein the generating of the plurality of transmission signals comprises encoding the plurality of transmission signals based on a Hadamard matrix,
wherein the generating of the plurality of transmission signals comprises
providing a single polarity signal having only the first polarity or the second polarity in response to a situation in which a number of transmission signals is greater than 2N and less than 2N+1, wherein N is a natural number;
providing a first transmission signal that is generated from a subset of the Hadamard matrix; and
providing a second transmission signal that is generated from the subset, and
the detecting of the area in which the touch occurs on the touch panel comprises
determining a third mutual capacitance based on the single polarity signal; and
determining a fourth mutual capacitance based on the first transmission signal and the third mutual capacitance.

10. The method of claim 9, wherein the outputting of the plurality of receiving signals comprises determining whether a sum of elements of a specific row or a specific column in the Hadamard matrix is 0.

11. The method of claim 9, wherein
the generating of the plurality of transmission signals comprises
generating a first Hadamard sub-matrix in response to a situation in which the plurality of transmission signals is greater than $2^N$ and less than $2^{N+1}$, the first Hadamard sub-matrix encoding N transmission signals of the plurality of transmission signals, wherein the first Hadamard sub-matrix is a subset of the Hadamard matrix and has $2^N$ rows, and N is a natural number; and
overlapping a second Hadamard sub-matrix with a portion of the first Hadamard sub-matrix, the second Hadamard sub-matrix being configured to encode a remainder of the plurality of transmission signals, and
the detecting of the area in which the touch occurs on the touch panel comprises
determining a first mutual capacitance based on the first Hadamard sub-matrix; and
determining a second mutual capacitance based on the second Hadamard sub-matrix and the first mutual capacitance.

12. The method of claim 9, wherein the generating of the plurality of transmission signals comprises:
generating the transmission signals based on a symmetric Hadamard matrix, the symmetric Hadamard matrix being obtained by overlapping the Hadamard matrix with an area having a common row or column of which a sum of elements is not 0 in a matrix symmetric to the Hadamard matrix with respect to a y-axis.

13. The method of claim 9, wherein the providing of the plurality of transmission signals to the touch panel comprises:
sharing charges between a first input line configured to transmit a first transmission signal having the first polarity and a second input line configured to transmit a second transmission signal having the second polarity.

14. A touch sensor comprising:
a display panel; and
a touch panel on a surface of the display panel, the touch panel comprising
first to M-th input lines and first to N-th output lines configured to perform a touch sensing operation, wherein M is a natural number greater than or equal to 2, and N is a natural number greater than or equal to 2; and
processing circuitry configured to
generate first to M-th transmission signals based on a Hadamard matrix,
output at least one of the first to M-th transmission signals corresponding to a first row or a first column of the Hadamard matrix in a porch period of a display driving operation of the display panel,
output a remainder of the first to M-th transmission signals in a sensing period of the touch panel, wherein a vertical synchronous signal is applied in each frame of the touch panel, and
receive first to N-th receiving signals from the first to N-th output lines to determine touch coordinates,
wherein the first to N-th receiving signals include signals corresponding to the at least one of the first to M-th transmission signals and the remainder of the first to M-th transmission signals,
wherein the first to M-th input lines is greater than 2N and less than 2N+1, and the processing circuitry is further configured to
provide a single polarity signal having only a first polarity or a second polarity to a first input line of the first to M-th of input lines,
provide the first to M-th transmission signals to a remainder of the input lines, the first to M-th transmission signals being based on a third Hadamard sub-matrix,
determine a third mutual capacitance based on the single polarity signal, and
determine a fourth mutual capacitance based on the third Hadamard sub-matrix and the third mutual capacitance.

15. The touch sensor of claim 14, wherein, in the sensing period, a number of rising edges of the first to M-th transmission signals is equal to a number of falling edges of the first to M-th transmission signals.

* * * * *